3,258,343
PREPARATION OF GARLIC CONCENTRATES AND POWDERS

Peter P. Noznick and Robert H. Bundus, Chicago, Ill., assignors to Hy-Dri Corporation, Chicago, Ill., a corporation of Illinois
No Drawing. Filed May 1, 1962, Ser. No. 191,455
9 Claims. (Cl. 99—105)

This invention relates to a new and improved garlic concentrate and powder and to a process of preparing the same from raw garlic (*Allium sativum*). As is well known, garlic is cultivated throughout the world, and the bulb has a strong and characteristic odor and an acrid taste. While it yields an offensively smelling oil, essence of garlic, the product is highly prized as a seasoning and flavoring and has become an established article of diet.

The invention will be illustrated in the following examples.

Example 1

Frozen raw garlic is pulverized in the skins through a suitable means such as a Fitzpatrick Hammer Mill and while in a frozen condition the puverized garlic is then centrifuged at high speed, thereby separating the juice and pulp. A suitable filter aid such as "Pressaid L" is used to facilitate extraction. The juice is then spray dried.

Room temperature garlic can be used at the sacrifice of some flavor due to volatization, according to this example.

Example 1a

Instead of spray drying, as in the previous example, a binder, diluent and flavor entrapping agent (as otherwise the product is very potent), such as gum acacia, 20% by weight, is first added to the juice, and then the mixture is spray dried.

Example 1b

The pulp from the above processing in Example 1 or 1a is mixed with hot water and re-centrifuged, the effluent being added to the original juice of the prior examples before spray drying.

Examples 1c, 1d (1c) A sterile product is made by high temperature sterilization of the juice from Examples 1 and 1a, respectively (240° F. for 16 seconds), in a tubular heater, i.e., indirect heat transfer means, such as a conventional heat exchanger. Thus, a sterilized whole garlic product from Example 1 or 1b is formed which may be spray dried, as described.

(1d) The 80% product containing 20% gum acacia of Example 1a as described above, also is sterilized and then spray dried.

Products prepared in accordance with the foregoing examples are concentrates either in the form of the juice or the spray dried product, i.e., a powder. In all instances, the concentrates have an enhanced fresh garlic flavor and a greater flavoring strength at least three or four times stronger than currently existing products.

In referring to grinding and centrifuging the prefrozen broken up or pulverized garlic bulb at low temperatures, we mean from about 50° below 0° up to about 0°, the lower the temperature, the better.

Example 1e

The centrifuging step in the prior examples is carried out in the presence of $CO_2$, if desired.

Otherwise, the operations are the same as in the previous examples.

Example 1f

Pulverized raw garlic as in Example 1 is centrifuged without the use of a filter aid. The juice is spray dried with a binder, for example, gum acacia, and the pulp is roller dried. The resultant roller dried powder is reblended with powder resulting from the spray drying, the temperature of the roller dryer being 285° F. A range of 270° to 320° F. was used successfully.

Example 1g

In this example the garlic bulbs are not frozen. They are broken under mild pressure into individual cloves. The cloves are winnowed at 140° F. in warm air, such as an air blast having that temperature, with mechanical attrition such as a hammer mill or brushing apparatus sufficient to remove the skins without damage to the cloves. The mixture of skins, roots and cloves is then mechanically classified by any conventional classifier to thereby separate clean cloves from the roots and skins. The clean cloves are then washed in tap water or cool water and ground with a suitable size reduction device of a conventional character to a particle size of approximately .040 inch or less. A slurry is thus produced which is then digested with a cellulose digesting enzyme, that is, an enzyme which will reduce viscosity, and we have used successfully in this and similar examples enzymes such as "Cellulase 35," Pectinase and Amylase, respectively. In the present example, "Cellulase 35" was used, and the digestion took place at approximately 120° F. for 30 minutes, thereby reducing viscosity and altering the composition of the garlic so that desirable heat treatment may subsequently be employed without detrimental increase in viscosity or formation of a gel-like structure. The slurry is then further size reduced by mechanical means and heated in a stainless steel tubular heat exchanger bringing the temperature to 160° F.– 240° F., in the present instance 190° F., and holding for about 4 minutes, followed by cooling to 70° F. and preferably lower. This relatively high heating process is very desirable to (1) destroy bacteria, (2) stabilize the color, and (3) destroy enzyme activity. Raw puree or slurry is adjusted to contain about 30% total solids by adding water in the enzyme digesting vessel. The heat treated puree is then spray dried directly to produce a powder. In a modification of this example the raw or heat treated puree was mixed with about 10% sodium chloride resulting in a salt preserved puree containing about 37% total solids and about 10% salt. The digestion was done in a vapor tight vat.

Example 1h

This example is the same as Example 1g. However, the raw puree in the vapor-tight enzyme digestion vat was heated to 140° F., 165° F. and 190° F., respectively, for about 5, 15, and 30 minutes, respectively, the time being inversely proportional to the temperature, i.e., the higher the temperature the lower the heating time, cooled and enzyme digested as in Example 1g. The purpose of this step is to make the gums more readily digestable by the enzyme, i.e., the gums present in the puree.

The process of these Examples 1g and 1h and the variations referred to above has notable advantages over conventional methods of garlic powder production in that (1) complete enzyme activity is achieved prior to dehydration resulting in a powder of a high, uniform and stable flavor level, (2) the heat treatment greatly reduces bacterial population and (3) flavor substances are enzymatically produced and retained that result in a powder three to four times the flavoring strength of garlic powder produced from the same raw material by conventional methods of chip dehydration followed by grinding to a powder.

Referring to Example 1f above, this has been carried out without the use of a binder such as gum acacia with satisfactory results, the process being otherwise the same as Example 1f.

Referring to Examples 1g and 1h, the winnowing in the warm air blast may be done with the air at a temperature between about 135°–145° F., and the particle size of .040 inch is substantially the maximum size and preferably the particle size is less. The enzymatic digestion in Example 1g is satisfactorily carried out at temperatures from approximately 115° F. to 130° F. for 10–40 minutes, the higher the temperature, the lower the heating time.

As stated, this process 1g and 1h, while described in connection with "Cellulase 35" of Rohm & Haas, was also conducted using a viscosity reducing enzyme such as Pectinase in a similar example and Amylase in a similar example.

In referring to a temperature range of 160° F.–240° F. and holding for about 4 minutes, it is to be understood that this time period may be reduced to 2 minutes at the increased temperature and raised to 10 minutes where the temperature is reduced. The preferred temperature range and time period range is 180° F.–220° F. for about 3 to 4 minutes. The subsequent cooling is to room temperature for most purposes, namely, about 70° F. as recited, but a temperature of about 35° F.–105° F. is satisfactory.

The concentrates, whether in the form of the juice or the powder, and whether containing the diluent binder and flavor entrapping agent, such as gum acacia, have a very high flavoring strength, that of the whole product of Example 1 being naturally greater than the 80% product of Example 1a. In each case, however, the concentrate or powder has the very desirable and enhanced fresh garlic flavor.

In referring to the pulverization of the garlic bulbs while in frozen condition, we have in mind the use of temperatures well below 0° F., and in the foregoing examples the bulbs were broken up and pulverized at a temperature of 50° below zero.

The value of the low temperature condition of the garlic bulbs at the time of grinding and also when the centrifuging takes place with the pulverized garlic at a low temperature and in the presence of $CO_2$, which latter is optional, resides in slowing up the enzymic action somewhat whereby to control the production of garlic flavor and reduce the rate of volatilization of odors and flavors which occur more rapidly at high temperatures.

In referring to high temperature short-time sterilization, we have used successfully temperatures from 240° F. for 16 seconds to 275° F. for 5 seconds.

In describing all the examples and their respective resultant products, it is to be significantly noted that the new powder or concentrate is different than that made by conventional methods, i.e., current dehydration is of the sliced garlic chips in which little to no enzyme activity has taken place. The chips, when reduced to powder or used as is, upon rehydration do not develop the same amount or kind of flavor components as resulting from our process. This difference is significantly apparent upon dilution taste tests and indicates a difference not only in strength but in type or quality of flavor, i.e., the new product is more like fresh mascerated garlic. The qualitative and quantitative differences are also apparent in the amount of distillable, heavier-than-water garlic oil obtained from the new and conventional process, the new process yielding a higher oil content in the powder made from the same raw garlic. Also a distillable, water soluble fraction is obtained from the new product which forms a black precipitate upon the addition of lead acetate, and the conventional powder water soluble fraction does not do so, in the respective products as initially formed.

The ability to spray dry garlic powder of such highly esteemed quality is a new and unexpected result. Garlic has previously been spray dried, but with such poor results as to result in the abandonment of this approach in publications of texts, references, and periodicals.

Additionally, garlic powder made from conventional processing decreases in strength upon storage of powder, i.e., the steam distillable, heavier-than-water oil fraction decreases in amount upon storage of powder. However, our new powder does not do so.

The hot air is used in Examples 1g and 1h to dry and shrink the skin from the clove thereby facilitating its removal and the temperature and time may be as high as can be used as long as the garlic clove is not impaired.

We claim:

1. A process of preparing a garlic concentrate comprising breaking up raw garlic while the same is maintained at a temperature below about 0° F., centrifuging the broken up product at said temperature to separate the juice and pulp and filtering to obtain the juice as a garlic concentrate.

2. The process according to claim 1 in which a flavor entrapping agent selected from the group consisting of gums, starches and dextrins is added to the juice.

3. The process according to claim 1 wherein the pulp from the centrifuging step is mixed with hot water, re-centrifuged, and the effluent added to the original juice.

4. The process according to claim 1 wherein at least one of the steps of breaking up of the garlic bulb and centrifuging is carried out in the presence of carbon dioxide.

5. The process according to claim 4 wherein the centrifuging is carried out with the broken up garlic at a temperature —50° F. to 0° F.

6. A process of preparing a garlic concentrate comprising breaking up raw garlic at room temperature, centrifuging the broken up product at said temperature to separate the juice and pulp, filtering to obtain the juice, adding to the juice a flavor entrapping agent as a garlic concentrate selected from the group consisting of gums, starches, and dextrins as a garlic concentrate.

7. The process according to claim 6 wherein a sterile product is obtained by a high temperature short time sterilization of the juice at a temperature of about 240° F. for 16 seconds to 275° F. for 5 seconds.

8. The process according to claim 6 wherein the juice is spray dried.

9. The process according to claim 6 wherein the flavor entrapping agent is gum acacia.

References Cited by the Examiner

UNITED STATES PATENTS

| | | | |
|---|---|---|---|
| 1,038,334 | 9/1912 | Fleck | 99—140 |
| 1,166,887 | 1/1916 | Chila | 99—140 |
| 1,800,501 | 4/1931 | Bornegg | 99—206 |
| 2,341,152 | 2/1944 | Moskovits | 99—204 |
| 2,467,318 | 4/1949 | Kellogg | 99—204 |
| 2,618,561 | 11/1952 | Spinka et al. | 99—140 |
| 2,760,869 | 8/1956 | Yanick | 99—14 |

A. LOUIS MONACELL, *Primary Examiner.*

ABRAHAM H. WINKELSTEIN, RAYMOND N. JONES, *Examiners.*

R. S. AULL, *Assistant Examiner.*